United States Patent [19]
Hatch

[11] Patent Number: 6,163,567
[45] Date of Patent: *Dec. 19, 2000

[54] METHOD AND APPARATUS FOR CODE SYNCHRONIZATION IN A GLOBAL POSITIONING SYSTEM RECEIVER

[75] Inventor: Ronald R. Hatch, Wilmington, Calif.

[73] Assignee: Leica Geosystems Inc., Norcross, Ga.

[ * ] Notice: This patent is subject to a terminal disclaimer.

[21] Appl. No.: 09/219,541

[22] Filed: Dec. 22, 1998

Related U.S. Application Data

[63] Continuation of application No. 08/449,215, May 24, 1995, Pat. No. 6,023,489.

[51] Int. Cl.$^7$ .................................................. H04K 1/00
[52] U.S. Cl. ................................. 375/149; 375/150
[58] Field of Search ................................. 375/200, 206, 375/208, 354, 316, 362, 371, 130, 140, 142, 144, 145, 147, 158, 149, 343

[56] References Cited

U.S. PATENT DOCUMENTS

| | | | |
|---|---|---|---|
| 4,649,549 | 3/1987 | Halpern et al. | 380/32.5 |
| 4,972,431 | 11/1990 | Keegan | 375/200 |
| 5,101,416 | 3/1992 | Fenton et al. | 375/200 |
| 5,414,729 | 5/1995 | Fenton | 375/142 |
| 5,579,345 | 11/1996 | Kroeger et al. | 375/344 |
| 5,600,670 | 2/1997 | Turney | 375/208 |
| 5,729,571 | 3/1998 | Park et al. | 375/206 |
| 5,963,582 | 10/1999 | Stansell, Jr. | 375/130 |

*Primary Examiner*—Tesfaldet Bocure
*Attorney, Agent, or Firm*—Noel F. Heal

[57] ABSTRACT

An improved method and apparatus for effecting code synchronization in a global positioning system receiver is disclosed herein. Within the receiver, digital in-phase (I) and quadrature (Q) samples of a plurality of received pseudo-random noise (PRN) encoded signals are provided to a code synchronization circuit. The code synchronization circuit is designed for coherent-mode operation when the receiver has achieved phase-lock with one of the PRN encoded signals, and operates in a non-coherent mode otherwise.

The code synchronization circuit includes an I-channel correlator for producing a coherent-mode discrimination signal by correlating in-phase (I) samples of a first of said PRN encoded signals with a discrimination pattern, wherein the first PRN encoded signal is encoded with a first PRN code. The discrimination pattern is comprised of two or more PRN code modulation components, the phases of which are adjusted based on the value of a code phase control signal obtained by averaging or otherwise processing the coherent-mode discrimination signal.

During non-coherent mode operation, both the in-phase (I) and quadrature (Q) samples of one of the PRN-encoded signals are correlated with a discrimination pattern and with a locally-generated replica of the PRN code. The results of the two I-channel correlations are then multiplied, as are the results of the Q-channel correlations. The resultant product signals generated during the multiplications are then combined into a non-coherent mode discrimination signal.

24 Claims, 6 Drawing Sheets

METHOD AND APPARATUS FOR CODE SYNCHRONIZATION IN A GLOBAL POSITIONING SYSTEM RECEIVER

CROSS REFERENCES TO RELATED APPLICATIONS

This application is a continuation of U.S. Ser. No. 08/449,215 filed on May 24, 1995, now issued as U.S. Pat. No. 6,023,489 on Feb. 08, 2000.

The present invention relates generally to Global Positioning System ("GPS") signal receivers. More particularly, the present invention relates to a novel and improved technique for code synchronization within such receivers which is highly insensitive to received multipath signal energy.

BACKGROUND OF THE INVENTION

The global positioning system (GPS) may be used for determining the position of a user on or near the earth, from signals received from multiple orbiting satellites. The orbits of the GPS satellites are arranged in multiple planes, in order that signals can be received from at least four GPS satellites at any selected point on or near the earth.

The nature of the signals transmitted from GPS satellites is well known from the literature, but will be described briefly by way of background. Each satellite transmits two spread-spectrum signals in the L band, known as L1 and L2, with separate carrier frequencies. Two signals are needed if it is desired to eliminate an error that arises due to the refraction of the transmitted signals by the ionosphere. Each of the carrier signals is modulated in the satellite by at least one of two pseudorandom noise (PRN) codes unique to the satellite. This allows the L-band signals from a number of satellites to be individually identified and separated in a receiver. Each carrier is also modulated by a slower-varying data signal defining the satellite orbits and other system information. One of the PRN codes is referred to as the C/A (clear/acquisition) code, while the second is known as the P (precision) code.

In the GPS receiver, the signals corresponding to the known P-code and C/A code may be generated in the same manner as in the satellite. The L1 and L2 signals from a given satellite are demodulated by aligning the phases, i.e., by adjusting the tiring, of the locally-generated codes with those modulated onto the signals from that satellite. In order to achieve such phase alignment the locally generated code replicas are correlated with the received signals until the resultant output signal power is maximized. Since the time at which each particular bit of the pseudorandom sequence is transmitted from the satellite is defined, the time of receipt a particular bit can be used as a measure of the transit time or range to the satellite. Again, because the C/A and P-codes are unique to each satellite, a specific satellite may be identified based on the results of the correlations between the received signals and the locally-generated C/A and P-code replicas.

Each receiver "channel" within the GPS receiver is used to track the received signal from a particular satellite. A synchronization circuit of each channel provides locally generated code and carrier replicas, which are synchronous with each other. During acquisition of the code phase within a particular channel, the received satellite signal is correlated with a discrimination pattern comprised of some combination of "early" and "late" versions of the channel's locally generated code replica. The resultant early-minus-late correlation signals are accumulated and processed to provide feedback signals to control code and carrier synchronization.

Historically, the phase difference between the early and late code versions generated within the GPS receiver has been equivalent to one code chip (Le., 1.0 chip correlator spacing). A number of factors have contributed to widespread use of early-minus-late discrimination patterns relying upon 1.0 chip correlator spacing. For example, in analog GPS receivers this correlator spacing minimized the required hardware. Also, early GPS receivers typically utilized P-code (rather than C/A code) tracking, in which synchronization is established with relatively short-duration P-code chips. As a consequence, it was believed that the use of narrow correlator spacings, i.e., less than 1 chip, could result in loss of code lock due to Doppler and other disturbances. Such narrower spacings also increase the requisite speed of P-code signal processing circuitry, which is of necessity already relatively fast due to the high P-code, chip rate.

Recently, digital GPS receivers relying upon C/A code tracking have been developed which employ correlator spacings of less than one C/A code chip. Such narrow correlator spacing is believed to reduce code-tracking error by increasing the correlation between the "early" and "late" noise contributions, which tend to cancel in the early-minus-late code discriminator. Although discrimination patterns characterized by narrow early-minus-late correlator spacing afford improved C/A code tracking, such early-minus-late discrimination schemes are still relatively sensitive to received multipath signal energy. Multipath signal energy arises due to reflections of the satellite signals from objects within the vicinity of the GPS receiver antenna. Since the multipath signals are processed together with the GPS signal directly received from the satellite, code and carrier tracking can be significantly corrupted by multipath errors.

Since multipath energy is always delayed relative to directly received GPS signals, multipath energy tends to corrupt the locally generated "late" version of a code signal rather than the early version. As a consequence, GPS receivers have been developed which utilize an "early-minus-prompt" discrimination pattern in the code correlation process. By forming the discrimination pattern based on the difference of the early and prompt, or "on-time", code replicas, it has been possible to somewhat reduce the deleterious effects of multipath. However, it is believed that substantially improved performance could be obtained through the use of discrimination patterns even less susceptible to adverse multipath effects.

Accordingly, it is an object of the present invention to provide a method of code synchronization which is even less sensitive to the effects of multipath than are techniques predicated on the use of "early-minus-prompt" discrimination patterns.

SUMMARY OF THE INVENTION

The present invention achieves these and other objectives by providing an improved method and apparatus for effecting code synchronization in a global positioning system receiver. Within the receiver, digital in-phase (I) and quadrature (Q) samples of a plurality of received pseudorandom noise (PRN) encoded signals are provided to a code synchronization circuit. The code synchronization circuit is designed for coherent-mode operation when the receiver has achieved phase-lock with one of the PRN encoded signals, and operates in a non-coherent mode otherwise.

The receiver includes an I-channel correlator for producing a coherent-mode discrimination signal by correlating in-phase (I) samples of a first of the received PRN encoded signals with a discrimination pattern, wherein the first PRN encoded signal is encoded with a first PRN code. The discrimination pattern is comprised of two or more PRN code modulation components, the phases of which are adjusted based on the value of a code phase control signal obtained by averaging or otherwise processing the coherent-mode discrimination signal.

During non-coherent mode operation, both the in-phase (I) and quadrature (Q) samples of one of the PRN-encoded signals are correlated with a discrimination pattern. In addition, the in-phase (I) and quadrature (Q) samples of the one PRN-encoded signal are also correlated with a locally-generated replica of the PRN code used to encode the one PRN-encoded signal. The results of the two I-channel correlations are then multiplied, as are the results of the Q-channel correlations. Next, the resultant product signals are combined into a non-coherent mode discrimination signal. A non-coherent mode code phase control signal, useable to control the phase of the locally-generated PRN-encoded signal is obtained by averaging or otherwise processing the non-coherent mode discrimination signal.

In a preferred implementation, the first and second modulation components are generated to be of nonzero values for first and second intervals, respectively, during each period of the PRN-encoded signal, and to be of zero value otherwise. It has also been found that improved synchronization may be achieved by scaling the magnitude of the first modulation component relative to the magnitude of the second modulation component.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
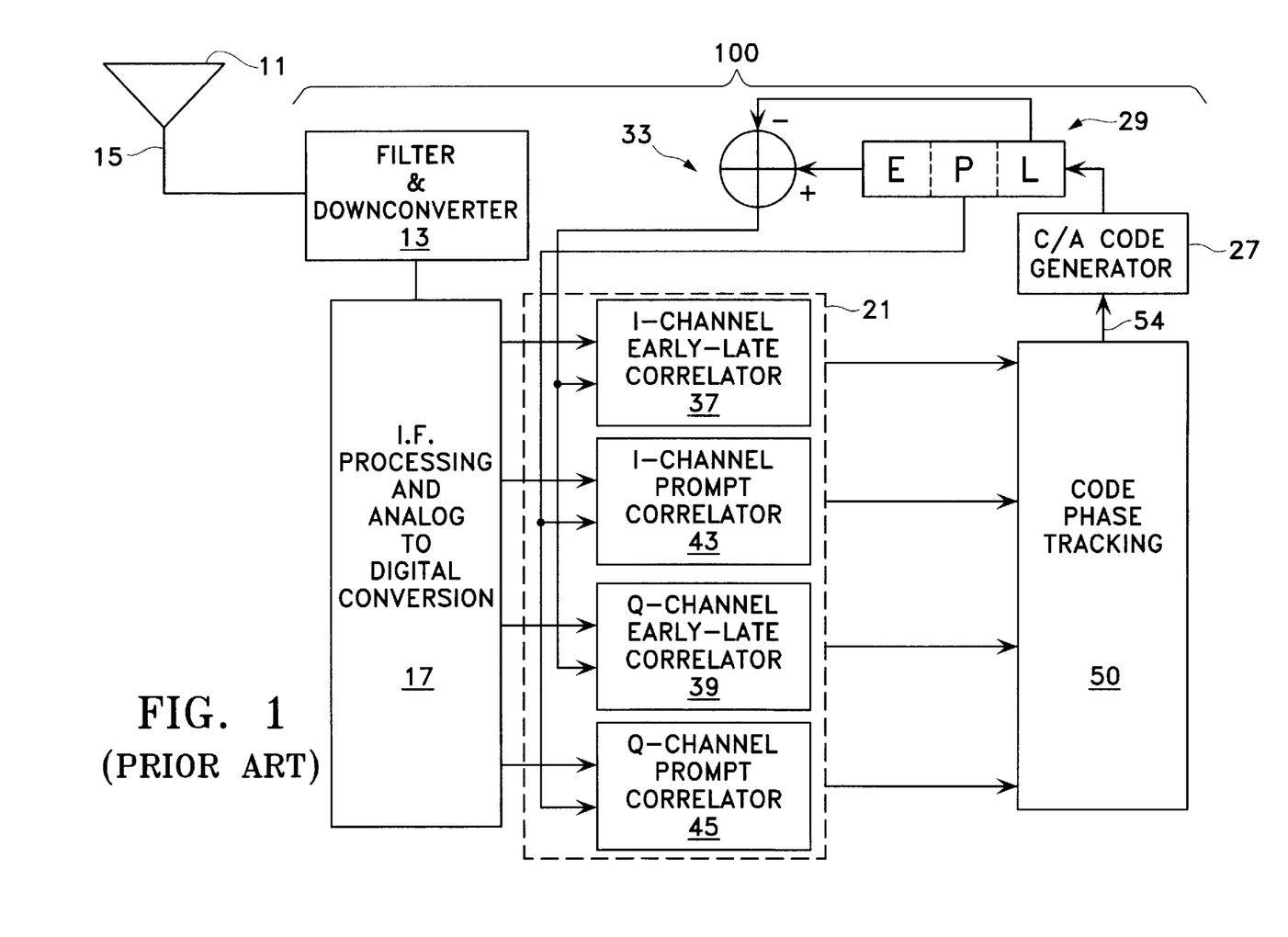
FIG. 1 shows a block diagram representation of a conventional global positioning system (GPS) receiver.

Referring to FIG. 1, there is shown a block diagram representation of a conventional global positioning system (GPS) receiver 10. As shown in FIG. 1, the L1-band and L2-band PRN-encoded frequency signals simultaneously received by an antenna 11 from a plurality of GPS satellites are supplied to an R.F. downconverter 13 through a high-frequency transmission line or waveguide 15. The R.F. downconverter 13 is operative to convert the received signals to a plurality of intermediate frequency (I.F.) signals. The I.F. signals from downconverter 13 are supplied to an I.F. processing network 17, which includes an intermediate frequency section and a set of analog-to-digital converters. The I.F. processing network 17 provides phase quadrature digital representations of one of the received L1-band (or L2-band) PRN-encoded satellite signals, which are respectively identified hereinafter as In-Phase ($L1_I$) and Quadrature-Phase ($L1_Q$) signal components. The digitized L1 band signals $L1_I$ and $L1_Q$ are said to be in "phase quadrature" due to the phase shift of 90 degrees existing between their respective L1-band carriers.

The L1-band digital outputs from the I.F. processing network 17 are supplied to a set of baseband processors 21, one of which is shown in FIG. 1. Each baseband processor 21 is associated with a separate satellite from which a signal is received. The number of baseband processors provided is sufficient to ensure that a separate baseband processor is available for each received satellite signal. As is described below, each baseband processor 21 correlates the I.F. outputs from the network 17 with a locally generated replica of the C/A code unique to a given satellite. The I.F. outputs are also correlated with a discrimination pattern comprised of the difference between early and late versions of the locally generated C/A code.

Referring to FIG. 1, a C/A code generator 27 is seen to provide a C/A code replica to an early-prompt-late (EPL) shift register 29 which includes early (E), prompt (P) and late (L) gates. An early-minus-late discrimination pattern is formed by combiner 33 by taking the difference between the C/A code samples latched by the early (E) and late (L) gates. Successive samples of the C/A code replica produced by the C/A code generator 27 are circulated through the EPL shift register 29 at a clock rate selected in accordance with the desired time offset (i.e., "correlator spacing") between the early and late C/A code samples comprising each sample of the discrimination pattern. For example, to achieve a one chip correlator spacing the clock rate through the EPL shift register 29 is selected such that a time offset of ½ chip exists between the early (E) and prompt (P) samples, and hence so that a time offset of ½ chip also exists between the prompt (P) and late (L) samples. Narrower correlator spacings are obtained by increasing the clock rate at which C/A code samples are passed through the EPL shift register 29.

Referring again to FIG. 1, the I.F. outputs from the network 17 are correlated with the early-minus-late (E-L) discrimination pattern from the combiner 33 within L1 I-channel and L1 Q-channel E-L correlators 37 and 39. In addition, the prompt C/A code samples from the register 29 are correlated with the I.F. outputs using L1 I-channel and L1 P-channel prompt correlators 43 and 45. The correlation results from the correlators 37, 39, 43 and 45 are provided to a phase tracking processor 50, which adjusts the phase of the C/A code generator 27 so as to achieve phase-lock with the C/A code carried by the received GPS satellite signal.

Figure 2A:
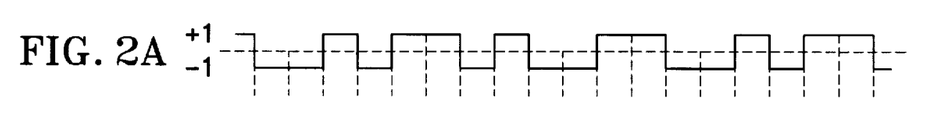
FIG. 2A is a timing diagram of an exemplary sequence of the C/A code carried by a received GPS satellite signal.

As mentioned above, a discrimination pattern characterized by one-chip correlator spacing may be formed within the combiner 33 by clocking the EPL shift register 29 such that a ½ chip phase difference exists between each of the early, prompt and late C/A code samples therein. Turning now to FIG. 2A, a timing diagram is provided of the C/A code carried by the received GPS satellite signal. The vertical dashed lines of FIG. 2A are representative of the C/A code clock period, and hence are separated by an interval equivalent to the duration of one C/A code chip. As is indicated by FIG. 2A, transitions in the logical state of the received C/A code occur at the boundaries between C/A code clock periods.

Figure 2B:
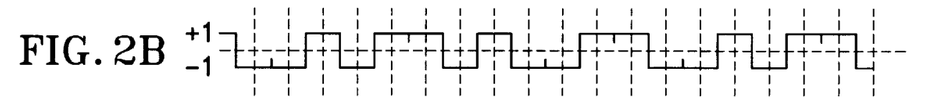
FIGS. 2B, 2C and 2E respectively depict locally- generated one-half chip early, one-half chip late, and prompt versions of the exemplary C/A code.
Figure 2C:
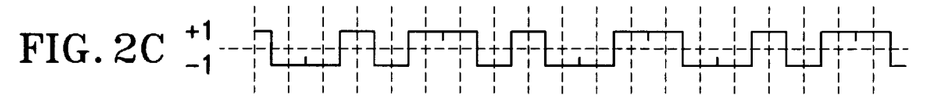
Figure 2D:
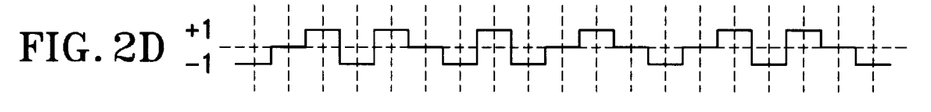
FIG. 2D is a timing diagram of a normalized early-minus-late discrimination pattern (DP) characterized by one-chip correlator spacing.
Figure 2E:
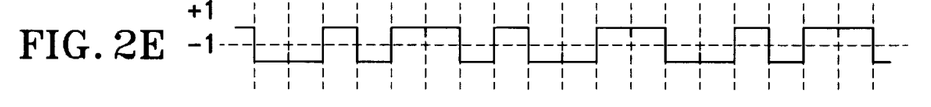

In FIGS. 2B, 2C and 2E, the locally generated one-half chip early, one-half chip late, and prompt C/A codes are respectively depicted. In the exemplary representation of FIG. 2 is assumed that the C/A code generator 27 is locked to the phase of the received C/A code. Accordingly, the prompt C/A code (FIG. 2E) is seen to be in precise time-alignment with the received C/A code (FIG. 2A).

Referring to FIG. 2D, a timing diagram is provided of a normalized early-minus-late discrimination pattern (DP) characterized by one-chip correlator spacing. The standard early-minus-late DP of FIG. 2D is seen to be of a value of negative one for a one-chip period centered about each positive to negative transition in the received C/A code (FIG. 2A). That is, the standard DP "brackets" each such C/A code by exhibiting a value of negative one for a period of one-half chip before and after each transition. Similarly, the standard DP brackets each negative to positive C/A code transition by being of a value of positive one for a one-chip period about each transition. It is observed that the standard DP only assumes a zero value about each C/A code clock boundary (vertical dashed line) at which the received C/A code fails to transition between logical states.

The processor 50 is generally disposed to operate in one of two modes depending upon whether or not the receiver 10 has become phase-locked to the carrier frequency of the received GPS signal. Prior to the establishment of phase-lock with the received carrier, the processor 50 operates in a non-coherent mode to strip the received carrier from the outputs of the E-L correlators 37 and 39. Specifically, the output of the I-channel E-L correlator 37 is multiplied by the output of the I-channel prompt correlator 43, and the output of the Q-channel E-L correlator 39 is multiplied by the output of the Q-channel prompt correlator 45. The two results are then added and averaged in order to produce a C/A code phase control signal 54 applied to the C/A code generator 27.

Once phase-lock with the received carrier has been established, the received carrier is completely removed from the received I-channel and Q-channel signals during correlation with the discrimination pattern in correlators 37 and 39. During such "coherent-mode" operation, the averaged output of the I-channel correlator 37 comprises the C/A code phase control signal 54 provided to the C/A code generator 27. The C/A code phase control signal 54 will be of a predefined DC value (typically zero) when the prompt and received C/A codes (FIGS. 2E and 2A) are in alignment. When the discrimination pattern (FIG. 2D) drifts in phase relative to the received C/A code (FIG. 2A), the ± 1 values of the discrimination pattern will no longer evenly "bracket" transitions in the C/A code. This misalignment is sensed by the processor 50, and the control signal 54 is adjusted in accordance with a non-zero value until phase alignment is again achieved with the received C/A code.

Figure 3A:
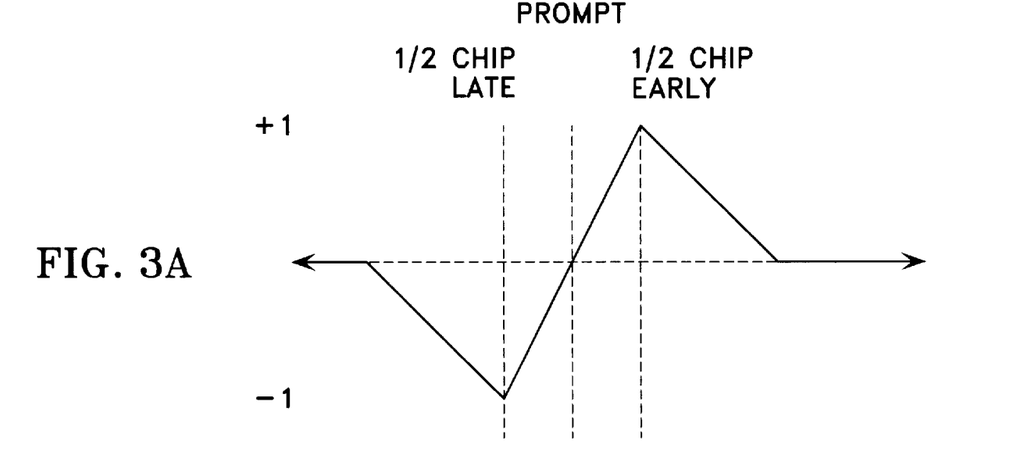
FIG. 3A is a graph of a discrimination function depicting variation in the DC value of the C/A code phase control signal generated within the GPS receiver of FIG. 1.

FIG. 3A is a graph of a discrimination function depicting variation in the DC value of the C/A code phase control signal 54. For convenience of illustration, FIGS. 3A–3D assume the existence of an infinite processing bandwidth within the GPS satellite and receiver. In the illustration of FIG. 3A, variation in the DC value of the signal 54 is represented as a function of the phase offset between the locally-generated prompt and received C/A codes (FIGS. 2E and 2A). For example, the control signal 54 assumes a normalized value of negative one when the prompt C/A code is ½ chip late relative to the received C/A code. Similarly, when the locally-generated prompt C/A code is ½ chip early relative to the received C/A code, the C/A code control signal becomes positive one. Since the prompt C/A code is synchronous with the early-minus-late (E-L) discrimination pattern (DP) produced by the combiner 33, FIG. 3A is equally representative of the variation in the value of the control signal 54 relative to the phase of the E-L DP.

Figure 2F:
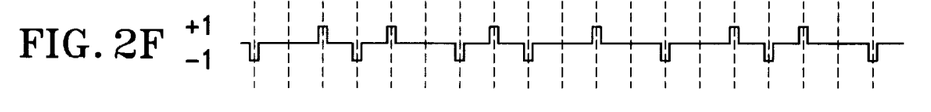
FIG. 2F is a timing diagram of ⅛ chip early minus ⅛ chip late discrimination pattern (DP).

As mentioned above, it has been found that the use of discrimination patterns characterized by a correlator spacing of less than one C/A code chip has enabled improved tracking performance in the presence of received multipath signal energy. Referring to FIG. 2F, a timing diagram is provided of a "⅛ chip early" minus "⅛ chip late" discrimination pattern (DP). In order to produce the DP of FIG. 2F, the clock rate of the EPL shift register 29 is increased relative to the case in which the correlator spacing is one C/A code chip. When the DP of FIG. 2F is supplied to the correlators 37,39,43 and 45, the DC value of the resultant C/A code phase control signal varies in accordance with the discrimination function of FIG. 3B.

Figure 2G:
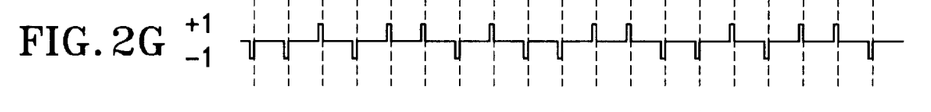
FIG. 2G illustratively represents an earliest one-eighth modulation component of a one-eight early version of the exemplary C/A code.
Figure 2H:
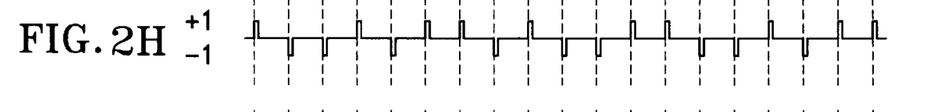
FIG. 2H illustrates the last one-eighth modulation component of a version of the exemplary C/A code which is shifted to the right by one-eighth of a C/A code chip.

As is described hereinafter, the present invention is directed to a technique for generating a uniquely-formatted discrimination pattern resulting in improved insensitivity to received multipath signal energy. Each discrimination pattern formed in accordance with the invention may be viewed as comprising two or more modulation waveforms, hereinafter referred to as "modulation components". One distinguishing feature of the discrimination patterns contemplated by the present invention is that the constituent modulation components assume non-zero values during only a small portion of each C/A code chip period. As an example, the timing diagram of FIG. 2G illustratively represents an "earliest one-eighth"0 modulation component of a "one-eighth early" version of the C/A code. That is, the modulation component of FIG. 2G may be generated by shifting the prompt C/A code (FIG. 2E) to the left by one-eighth of a C/A code chip, and by then setting the resultant shifted C/A code to zero except during the first one-eighth of each C/A code clock cycle. Similarly, FIG. 2H illustrates the last one-eighth modulation component of a version of the prompt C/A code which is shifted to the right by one-eighth of a C/A code chip. Although the present invention is described herein with reference to a discrimination pattern formed from signals modulated with the C/A code, the teachings of the present invention are equally applicable to discrimination patterns formed from P-code signals or various other types of PRN-encoded signals.

Figure 2I:
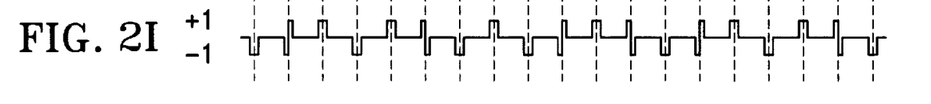
FIG. 2I is a timing diagram of a discrimination pattern in accordance with the invention obtained by using modulation components of one-eighth chip duration.

Referring now to FIG. 2I a discrimination pattern in accordance with the invention is obtained by subtracting the latest one-eighth component of the one-eighth late C/A code (FIG. 2H) from the first one-eighth component of a one-eighth early version of the prompt C/A code (FIG. 2G). Referring to FIG. 2I, it is seen that the discrimination pattern is of a value of positive and negative one for one-eighth chip intervals immediately before and after each chip boundary at which the received C/A code (FIG. 2A) does not transition between logical states. It follows that these one-eighth chip components are multiplied by the same value of the received C/A code, and hence that an average value of zero results. Since these one-eighth chip components "bracket" chip boundaries at which the received C/A code does not change logical state, small variations in the phase of the discrimination pattern will not alter this zero average value.

Figure 3B:
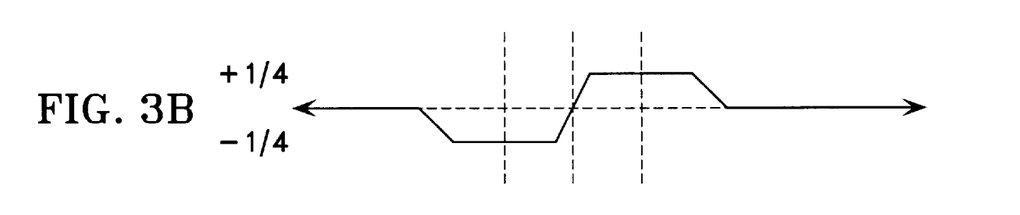
FIG. 3B depicts a discrimination function representative of the variation in the DC value of a C/A code phase control signal generated using the discrimination pattern of FIG. 2F or 2I.

As mentioned above, it has been found that received multipath energy adversely affects the "late" portion of conventional early-minus-late discrimination patterns. Similarly, in the discrimination pattern (DP) of FIG. 2I, the latest one-eighth component of the one-eighth late version of the C/A code is believed to be more susceptible to corruption by multipath than is the other modulation component of the DP. This stands to reason, since the conventional discrimination pattern of FIG. 2F and the discrimination pattern of FIG. 2I yield the same discrimination function (FIG. 3B).

Figure 2J:
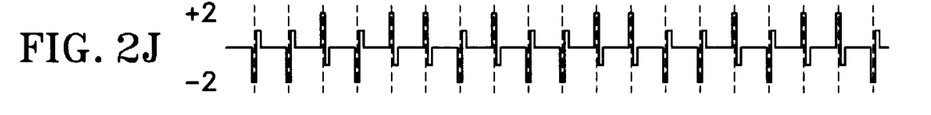
FIG. 2J depicts a discrimination pattern consisting of one-eighth chip modulation components of a one-sixteenth early-shifted version of the C/A code.

In accordance with the present invention, the discrimination patterns described hereinafter are formed exclusively from early-shifted C/A code modulation components. As an example, FIG. 2J depicts a discrimination pattern having a first modulation component consisting of the earliest one-eighth component of a one-sixteenth early-shifted version of the C/A code (scaled in magnitude by a factor of two). The discrimination pattern of FIG. 2J is formed by subtracting from the first modulation component a second modulation component. The second modulation component consists of the second earliest one-eighth component of a one-sixteenth early-shifted version of the C/A code (of unity magnitude). Since both of the modulation components of the discrimination pattern (DP) of FIG. 2J are derived from an early-shifted version of the C/A code, and hence do not incorporate any "late" components, the DP is believed to be substantially insensitive to received multipath signal energy.

Figure 2K:
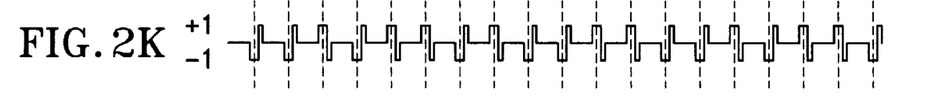
FIG. 2K provides another example of a discrimination pattern comprised exclusively of modulation components derived from an early-shifted version of the C/A code.

FIG. 2K provides another example of a discrimination pattern (DP) comprised exclusively of modulation components derived from an early-shifted version of the C/A code. In particular, the DP of FIG. 2K includes first and second modulation components consisting of the first and second earliest one-eighth components of a one-eighth early-shifted version of the C/A code. The DP of FIG. 2K is then formed by subtracting from the first two modulation components a third modulation component consisting of the third earliest one-eighth component of the one-eighth early-shifted version of the C/A code. It is observed that the discrimination patterns of FIGS. 2J and 2K both change value during every period of the C/A code, thereby bracketing each C/A code clock phase boundary irrespective of whether a transition in the received C/A code has occurred at the boundary. In contrast, conventional early-late discrimination patterns (e.g., FIG. 2D) only bracket changes in the logical state of the received C/A code.

Figure 4:
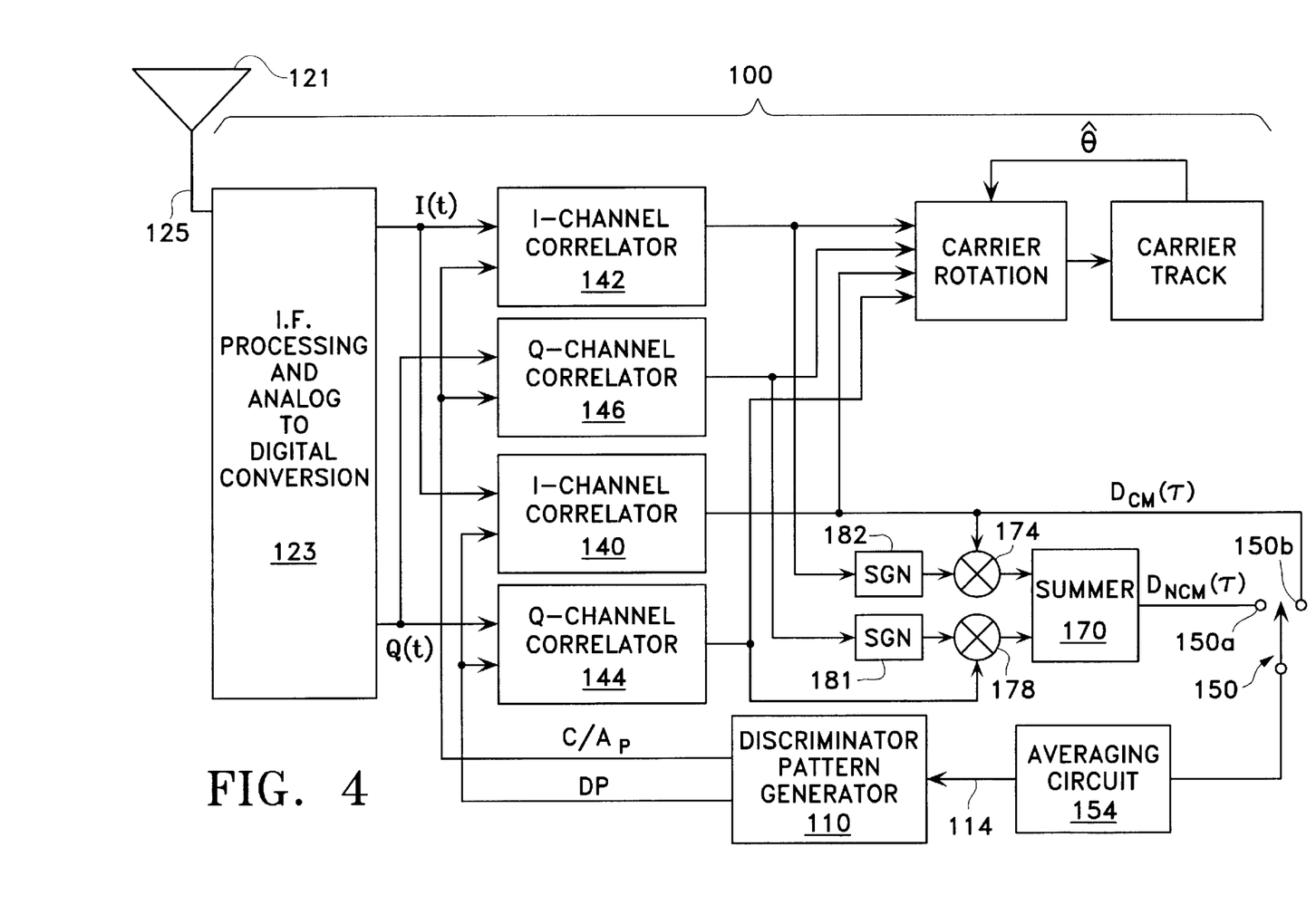
FIG. 4 shows a block diagram representation of a global positioning system (GPS) receiver configured to perform code-synchronization in accordance with the invention.

Referring now to FIG. 4, a functional block diagram representation is provided of a global positioning system (GPS) receiver 100 configured in accordance with the invention. The receiver 100 includes a discrimination pattern (DP) generator 110 disposed to generate discrimination patterns of the type depicted in FIGS. 2I–2K The phases of the discrimination patterns produced by the DP generator 110 are adjusted in accordance with a DP phase control signal 114, the value of which is indicative of the phase offset between the locally-generated C/A code (or P-code) and the C/A code (or P-code) carried by the received GPS satellite signals. As is discussed below, the DP phase control signal 114 is derived from the results of correlation of the discrimination patterns produced by the DP generator 110 with the received GPS satellite signals. During operation, the DP phase control signal 114 adjusts the phase of the C/A code or P-code clock signal generated within the DP generator 110, thereby achieving time-alignment between the phase of the locally-generated code and the code phase of the received satellite signals.

In the functional representation of FIG. 4, the PRN-encoded GPS signals simultaneously received by an antenna 121 from a plurality of GPS satellites are supplied to a frequency conversion network 123 through a high-frequency transmission line or waveguide 125. The network 123 is operative to convert the received GPS signals to a plurality of digitized intermediate frequency (I.F.) signals. Specifically, the network 123 provides In-phase and Quadrature digital representations of the received L1-band C/A-encoded GPS satellite signal. It is understood, however, that the teachings of the invention could be equally applied to facilitate synchronization with the P-code carried by either L1-band or L2-band signals.

When expressed as a function of time, the received In-phase L1 signal from a given satellite may be denoted as I(t), and is given by:

$$I(t) = \sqrt{S}C(t)d(t) + \alpha\sqrt{S}C(t-\sigma)d(t-\sigma)\cos\Theta_m$$

where C(t) is the received C/A code unique to the given satellite, d(t) is the received navigation data, S is the received signal power, $\alpha$ is the amplitude ratio between received multipath energy and the signal S, $\sigma$ is the time delay of the multipath relative to the received signal, and $\Theta_m$ is the relative phase between the signal and the multipath.

In the functional representation of FIG. 4, the signal I(t) from the given satellite may be viewed as being correlated with the discrimination pattern from the DP generator 110 within a first L1 I-channel correlator 140, and as being correlated with the locally-generated prompt C/A code ($C/A_p$) within a second L1 I-channel correlator 142. However, in a preferred implementation the functions performed by the DP generator 110 and the L1 I-channel correlator are combined within a unitary device hereinafter referred to as a modulation component discriminator module. The structure and operation of the modulation component discriminator module is described below with reference to FIG. 5.

Again referring to FIG. 4, the received signal Q(t), in phase quadrature with I(t), is correlated with the discrimination pattern from the DP generator 110 within a first L1 Q-channel correlator 144. Similarly, the received signal Q(t) is correlated with the locally-generated prompt C/A code ($C/A_p$) within a second L1 Q-channel correlator 146.

When the receiver 100 is initially turned-on or otherwise fails to maintain phase-lock with the carrier of the received GPS signal, the receiver 100 functions in a "non-coherent" mode. During non-coherent mode operation, a switch 150 is set to throw position 150a until phase-lock with the received carrier is again achieved. Descriptions of both coherent-mode and non-coherent mode operation of the receiver 100 are provided immediately below.

Coherent-Mode Operation

Upon the achievement of phase-lock with the received carrier, the switch 150 is set to throw position 150b in order to initiate coherent-mode operation. Under these conditions the navigation data d(t) may be separately removed from the received signal within a demodulator (not shown), hence allowing the received signal I(t) to be expressed as:

$$I(t) = \sqrt{S}C(t) + \alpha\sqrt{S}C(t-\sigma)\cos\theta_m$$

During coherent-mode operation, the output of the I-channel correlator 140 produces a coherent-mode discrimination signal $D_{CM}(\tau)$, which is provided to an averaging circuit 154. As is indicated by FIG. 4, the averaged value of the signal $D_{CM}(\tau)$ forms the DP phase control signal 114 supplied to the DP generator 110. In the general case, the signal $D_{CM}(\tau)$ may be expressed as:

$$D_{CM}(\tau) = \int_0^T I(t)\sum_1^K c_k(t-\tau)dt - \frac{1}{2}\int_0^T I(t)\sum_{K+1}^{2K} c_k(t-\tau)dt$$

where T is the period of the C/A code, and $c_k(t)$ is the $k^{th}$ modulation component included within a discrimination pattern (DP) comprised of a set of 2K modulation components. The modulation components $c_k(t)$ are defined as:

$$C_k(t) = \Sigma\beta_j\phi_k(t-jT_c)$$

where $\beta_j$ is the value (i.e., ±1) of the C/A code during a $j^{th}$ code cycle, and $\Phi_k(t)$ is a pulse function admitting to the following representation:

$$\phi_k(t) = 1 \text{ for}(k-1)T/N \leq t \leq kT/N$$

$$\phi_k(t) = 0 \text{ otherwise}$$

where N corresponds to the number of modulation components.

Non-Coherent Mode Operation

As mentioned above, during non-coherent mode operation the receiver 100 is out of phase-lock with the received carrier. In order to remove the carrier phase component from the received GPS signals, both the I-channel signal I(t) and the received Q-channel signal Q(t) are used during formation of the non-coherent mode discrimination signal $D_{NCM}(\tau)$. As an example, a quantitative representation of a non-coherent mode discrimination signal $D_{NCM}(\tau)$ derived from a discrimination pattern comprised of two modulation components $c_1$, $c_2$ is set forth below:

$$D(\tau) = \left[\int_o^T I(t)[c_1(t-\tau) - 0.5c_2(t-\tau)]dt\right] \cdot$$
$$sgn\left[\int_0^T I(t)C/A_p(t-\tau)dt\right] +$$
$$\left[\int_0^T Q(t)[c_1(t-\tau) - 0.5c_2(t-\tau)]dt\right] \cdot$$
$$sgn\left[\int_0^T Q(t)C/A_p(T-\tau)dt\right]$$

wherein $c_1$ and $c_2$ correspond to the two earliest modulation components of a version of the prompt C/A code ($C/A_p$) shifted early by the time offset $\tau$. For the specific case of the discrimination pattern depicted in FIG. 2J, the first modulation component c, corresponds to the earliest one-eighth component of a version of the prompt C/A code ($C/A_p$) shifted early by $\frac{1}{16}$of a C/A code chip (i.e., $\tau = T/16$). Similarly, the second modulation component corresponds to the next earliest one-eighth component of a version of the prompt C/A code ($C/A_p$) shifted early by T/16.

Figure 3C:
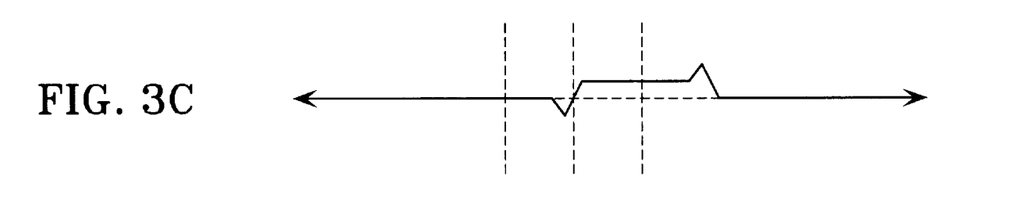
FIGS. 3C and 3D are graphs of the discrimination functions characterizing variation in the averaged value of discrimination signals generated using the discrimination patterns of FIGS. 2J and 2K, respectively.
Figure 3D:
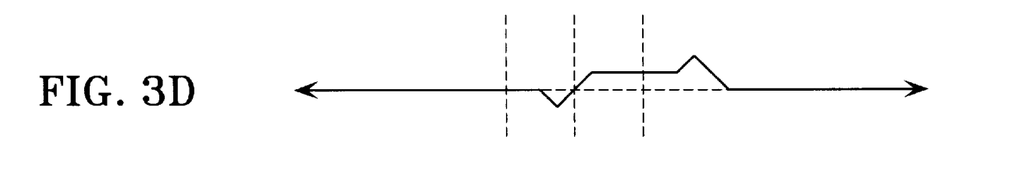

FIGS. 3C and 3D are graphs of the discrimination functions characterizing variation in the averaged value of the discrimination signals, i.e., of either $D_{cm}(\tau)$ or $D_{NCM}(\tau)$, generated using the discrimination patterns of FIGS. 2J and 2K, respectively. That is, the discrimination functions of FIG. 3C and 3D are equally representative of coherent-mode and non-coherent mode operation. FIG. 3C provides a representation of the variation in the value of the code phase control signal 114 for the case of the discrimination pattern depicted in FIG. 2J. Again, the horizontal axis of FIG. 3C is indicative of the phase offset between the received C/A code and the locally generated prompt C/A code ($C/A_p$).

Referring again to FIG. 4, a description will now be provided of those signal processing elements within the receiver 100 primarily responsible for generating the non-coherent mode discrimination signal $D_{NCM}(\tau)$. In particular, the signal $D_{NCM}(\tau)$ is seen to be provided by a summer 170, the output of which is switchably connected to the averaging circuit 154 through the switch 150. The summer 170 adds the product signals produced by first and second non-coherent channel multipliers 174 and 178. As is indicated by FIG. 4, multiplier 174 forms a first of the two product signals provided to summer 170 by multiplying the correlation result from the I-channel correlator 140 with the sgn 182 of the output produced by the I-channel correlator 142. Similarly, multiplier 178 forms a second product signal by multiplying the correlation result from the Q-channel correlator 144 with the sgn 184 of the output produced by the Q-channel correlator 146.

The receiver 100 further includes a carrier rotation circuit 192 and carrier track circuit 194 coupled to the I-channel correlators 140,142, and to the Q-channel correlators 144, 146. The carrier rotation and carrier track circuits 192 and 194 operate in a conventional manner to remove the carrier component from the correlated outputs produced by the correlators 140, 142, 144 and 146.

Figure 5:
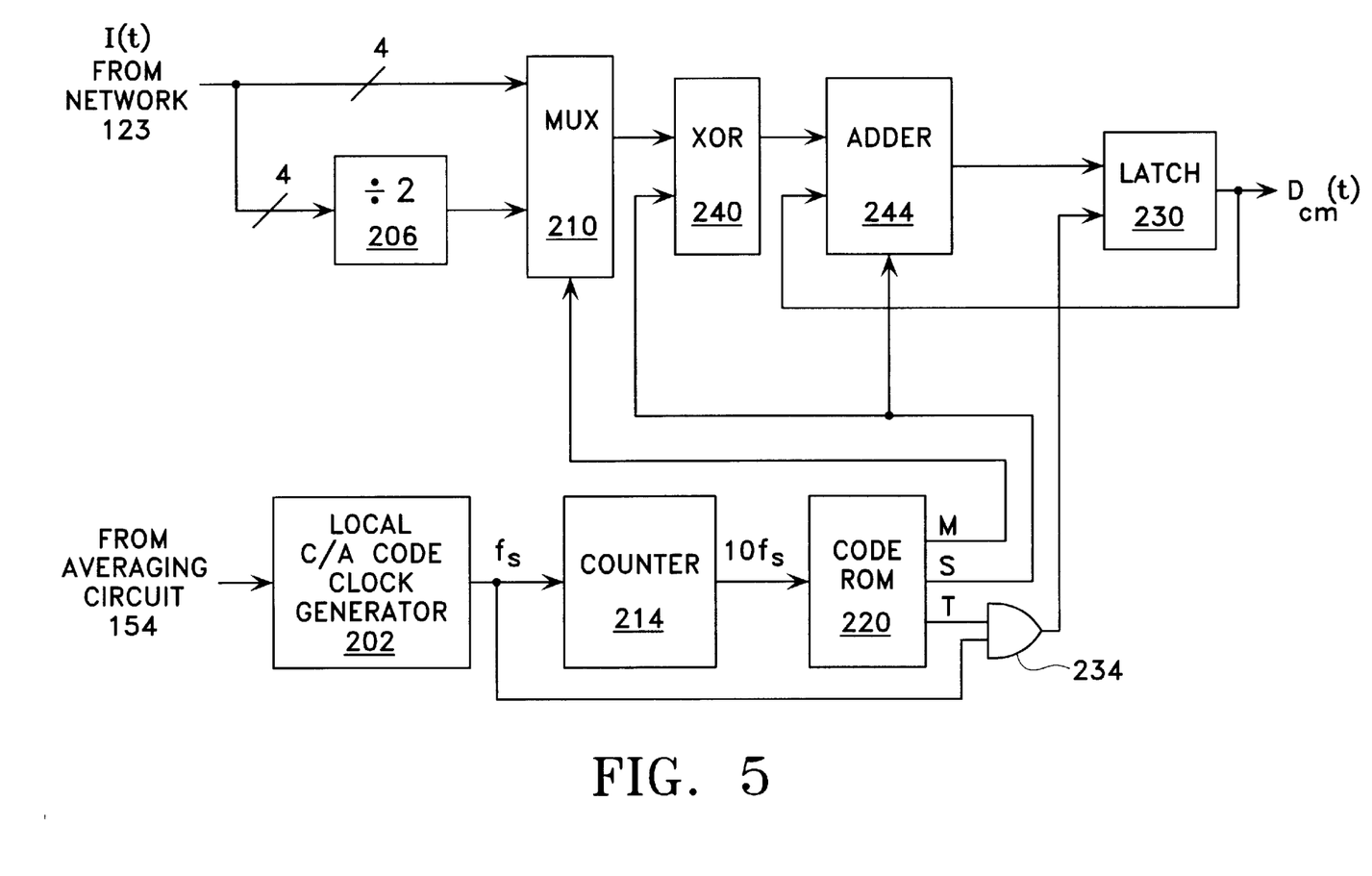
FIG. 5 depicts a preferred implementation of a component discriminator module operative to correlate the received I-channel satellite signal I(t) with a selected discrimination pattern (DP).

Turning now to FIG. 5, a preferred implementation is depicted of a component discriminator module operative to correlate the I-channel signal I(t) with the discrimination pattern (DP). The component discriminator module comprises a unitary apparatus which effects the functions performed by both the discrimination pattern generator and the I-channel correlator 140. As is discussed below, the component discriminator module is responsive to the DP phase control signal from the discriminator pattern generator 110, and produces the coherent mode discrimination signal $D_{CM}(\tau)$. In the exemplary embodiment of FIG. 5, the component discriminator module correlates the signal I(t) using a 10-component discrimination pattern in which each modulation component is of a duration of 0.1 code chips. This 10-component discrimination pattern is analogous to the 8-component discrimination pattern of FIG. 2J, in that it is formed by combining the first two of the ten available modulation components. That is, the 10-component discrimination pattern is formed by subtracting, from the first one-tenth of the locally-generated prompt code (i.e., C/A code or P code), the second one-tenth component of the locally-generated code scaled by a factor of one-half. This discrimination pattern is of the "A-0.5B" type described above, where "A" corresponds to the first one-tenth of the locally-generated prompt code and "B" corresponds to the second one-tenth of the locally-generated prompt code. In addition, both the first (A) and second (B) one-tenth modulation components are generated so as to be "shifted early" in time by $\frac{1}{20}$ of a code chip relative to the phase of the locally-generated prompt code.

As is indicated by FIG. 5, the component discriminator module includes a local code clock 202, the phase of which is controlled by the DP phase control signal 114 (FIG. 4). The local code clock 202 is used to synchronize a local code generator (not shown), which produces the locally generated version of the C/A code or P-code used by the I and Q channel correlators 142 and 144 (FIG. 4). The I-channel signal I(t), which in the embodiment of FIG. 5 comprises a 4-bit digital value received from the I.F. processing network 123 (FIG. 4), is provided to a divide-by-two circuit 206, as well as to a 2 to 1 multiplexer 210. If D3, D2, D1, and D0 represent the 4 bits of the I-channel signal I(t), where D0 corresponds to the least significant bit (LSB) and D3 to the most significant bit (MSB), then the 4-bit output of divide-by-two circuit 206 may be expressed as 0, D3, D2, D1.

During each code clock period defined by the local code clock 202, a counter 214 provides a sequence of ten addresses to the code programmable read only memory (PROM) 220. Each of the ten addresses identifies a memory location at which are stored values corresponding to each of the ten modulation components of the 10-component discrimination pattern used to correlate the I-channel signal I(t). In particular, the value of each of the ten modulation components comprising the ten component discrimination pattern is defined by a set of three bits, i.e., by a sign bit (S), a multiplex bit (M), and by a take/delete bit (T). In the exemplary embodiment the three bits (S, M, T) corresponding to each modulation component are stored within sequential memory locations within the code PROM 220, the first of which is specified by each of the ten different addresses received from the counter 214 during each code clock cycle.

Figure 6:
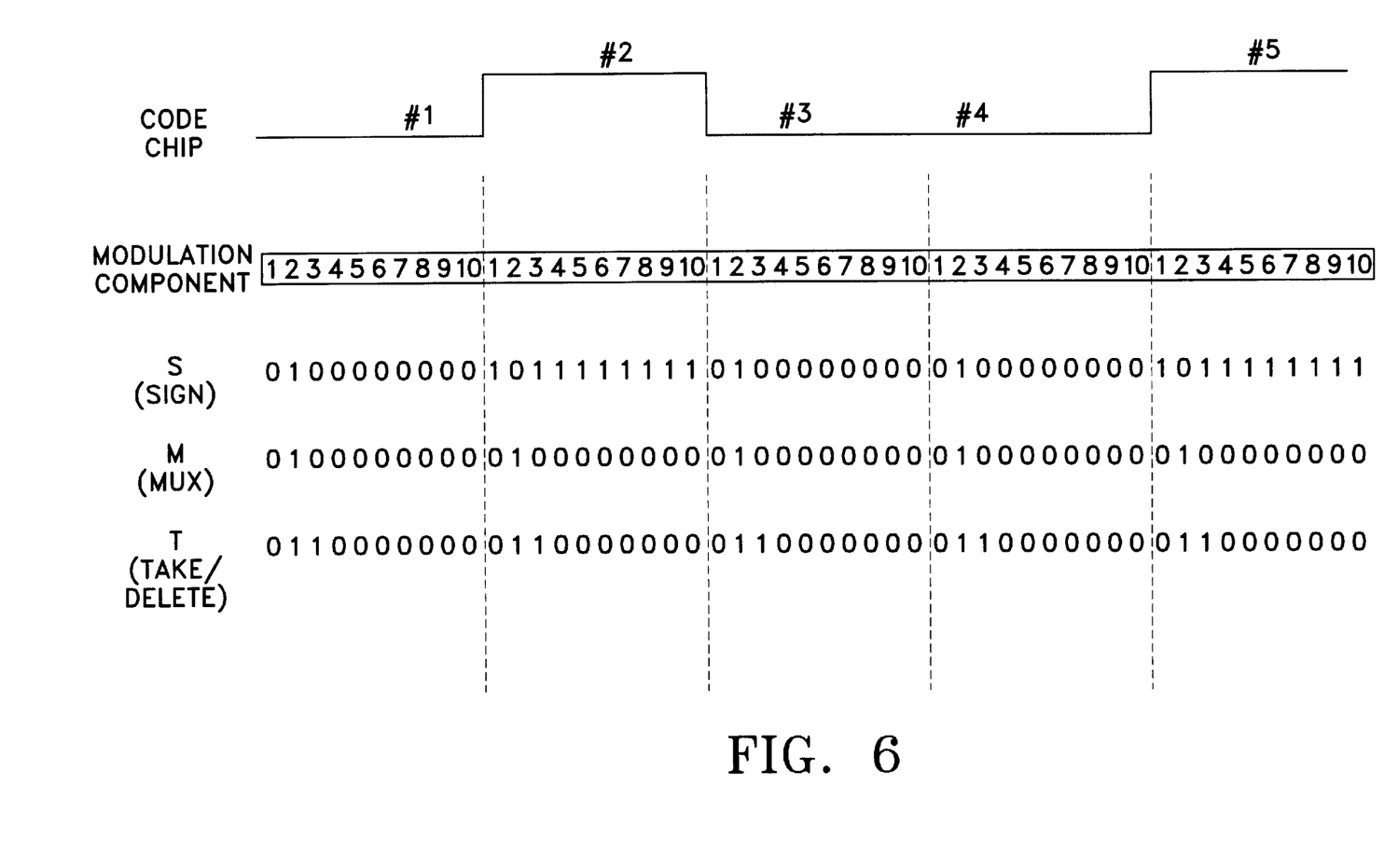
FIG. 6 provides an illustrative representation of the contents of a code programmable read-only memory (PROM) included within the component discriminator module of FIG. 5.

FIG. 6 provides an illustrative representation of the contents of the code PROM 220. As is indicated by FIG. 6, for each code clock period (i.e., "code chip") there are stored a sequence of ten sign (S) bits, ten mulitplex (M) bits, and ten take/delete (T) bits. In the specific example of FIG. 6, the first chip (#1) of the locally generated code is assumed to be a zero, the second chip (#2) is a one, the third chip (#3) is a zero, the fourth chip (#4) is a zero, and the fifth chip (#5) is a one. Although not shown in FIG. 6, a set of S, M and T bits associated with each of the remaining bits of the locally-generated C/A or P code are also stored within the code PROM 220. The multiplexer 210 is controlled by the "M" bit provided by the PROM 220. Specifically, the multiplexer selects the signal I(t) when M is 0, and selects the signal I(t)/2 from the divide-by-two 206 when the M bit is 1. It is observed that the values of the "M" bit are independent of the polarity (0 or 1) of each code chip (see FIG. 6). The sequence of M-bit values specified by FIG. 6 (0100000000), results in the multiplexer 210 selecting the value of the signal I(t) for each of the ten modulation components within the discrimination pattern, except that for the second modulation component the value of I(t)/2 from the divide-by-two 206 is selected instead. This results in the first, or "A", component of the "A-0.5B" type discrimination pattern being of unity magnitude, and of the second "B" component being of one-half magnitude.

The output of the multiplexer 210 is arithmetically combined with the value stored within latch 230 during every clock cycle of the code clock generator 202, which is coupled to the latch 230 through AND gate 234. This arithmetic combination, consisting of addition or subtraction, is effected using an exclusive-OR (XOR) gate 240 and a digital adder 244. In particular, the ten outputs from the multiplexer 210 produced during a given code clock cycle are XOR'd with corresponding ones of the ten sign bits (S) generated during the clock cycle. It is observed that the S bit corresponding to each modulation component is equal to the polarity of the local code (0 or 1), except with respect to the second modulation component, for which the S bit is of opposite polarity. That is, the first (A) modulation component of the "A-0.5B" type discrimination pattern is of the same sign as the local code, and the second (B) modulation component is of opposite sign.

The operation of the latch 230 is controlled by the take/delete (T) bit provided by the code PROM 220. When the value of the T bit is zero, the output of the adder 244 is prevented from entering the latch 230. Conversely, when the value of the T bit is zero, the output of the adder 244 is acquired by the latch 230. The identical sequence of T bit values (0110000000) generated during each code clock cycle results in the values from the adder 244 corresponding to the first two modulation components (i.e., the A and B components) being admitted into the latch 230, and the values corresponding to the remaining eight modulation components being prevented from entering the latch 230. In this way only the product of the signal I(t) with the first and second modulation components is accumulated within latch 230, which is required in order to effect correlation of the received signal I(t) in accordance with a "A-0.5B" type discrimination pattern. The initial "0"bit within the T-bit sequence (0110000000) introduces a one-tenth code clock delay in the T-bit sequence relative to the M-bit and S-bit sequences (FIG. 6), which is necessitated by the one-tenth code clock propagation delay between the multiplexer 210 and latch 230.

Although the component discriminator module of FIG. 5 could be implemented so as to generate modulation components "shifted early" in time by the requisite amount (e.g., $\frac{1}{20}$ of a code chip), a more practical technique for effecting this time shift may be employed. Specifically, if the discrimination patterns are not "shifted early" relative to the local clock phase by the component discriminator module, the resultant bias error may be removed mathematically in subsequent processing. Even if the resultant bias is not so removed, any consequent error developed in the estimated local clock phase may be immaterial in many applications.

The discriminator of FIG. 5 may be characterized as a "coherent mode" discriminator, in that it is operative to generate the coherent mode discrimination signal $D_{CM}(\tau)$. Those skilled in the art will realize that, with minor modification, such a discriminator could be also be used to generate the non-coherent mode discrimination signal $D_{NCM}(\tau)$ by correlating the Q-channel signal with a selected discrimination pattern.

Various modifications to the embodiments disclosed herein may occur to those skilled in the art without departing from the true spirit and scope of the invention as defined by the appended claims.

What is claimed is:

1. In a receiver for decoding a plurality of pseudorandom noise (PRN) encoded signals, said receiver providing digital in-phase (I) and quadrature (Q) samples of the PRN encoded signals, a code synchronization circuit comprising:

an I-channel correlator for producing a coherent-mode discrimination signal by correlating in-phase (I) samples of a first of said PRN encoded signals with a discrimination pattern, said first PRN encoded signal being encoded with a first PRN code;

a discrimination pattern generator for generating said discrimination pattern, said discrimination pattern being comprised of two or more pattern segments having multiple polarities, the segments being narrow relative to a PRN code clock period, and having selected widths and amplitudes, wherein the selection of widths, amplitudes and polarities of the segments of the discrimination pattern results in mitigation of multipath signal effects in code synchronization, and wherein phase of said discrimination pattern is adjusted based on said coherent-mode discrimination signal; and an averaging circuit for generating a code phase control signal by averaging said coherent-mode discrimination signal.

2. In a GPS receiver in which a code synchronization circuit produces a code phase control signal useable to adjust phase of a locally generated code signal relative to phase of a received pseudorandom noise (PRN) encoded signal, a discrimination pattern generator within said code synchronization circuit, said discrimination pattern generator comprising a waveform generator for generating a discrimination pattern having at least two pattern segments, including:

a first pattern segment having a predetermined phase relative to phase of a locally generated PRN code, and a second pattern segment shifted in phase relative to said first pattern segment;

wherein the pattern segments have multiple polarities, are narrow relative to a PRN code clock period, and have selected widths and amplitudes, and wherein the combined first and second pattern segments result in multiple occurrences of a discrimination pattern, each occurrence having components of different polarities and wherein the selection of widths, amplitudes and polarities of the segments of the discrimination pattern results in mitigation of multipath signal effects in code synchronization;

said discrimination pattern generator further including means for scaling magnitude of said first pattern segment relative to magnitude of said second pattern segment.

3. In a GPS receiver in which a code synchronization circuit produces a code phase control signal useable to adjust phase of a locally generated code signal relative to phase of a received pseudorandom noise (PRN) encoded signal, a method of producing a discrimination pattern for use within said code synchronization circuit, said method comprising the steps of:

generating a first pattern segment having a predetermined phase relative to phase of said PRN encoded signal;

generating a second pattern segment shifted in phase relative to said first pattern segment, wherein said first and second pattern segments have different polarities, are narrow relative to a PRN code clock period, and have selected widths and amplitudes;

combining said first and second pattern segments in order to form multiple occurrences of said discrimination pattern, wherein each occurrence of the discrimination pattern has signal components of both polarities and wherein the selection of widths, amplitudes and polarities of the segments of the discrimination pattern results in mitigation of multipath signal effects in code synchronization; and scaling magnitude of said first pattern segment relative to magnitude of said second pattern segment.

4. In a receiver for decoding a plurality of pseudorandom noise (PRN) encoded signals, the receiver providing digital in-phase (I) and quadrature (Q) samples of the PRN encoded signals, a code synchronization circuit comprising:

an I-channel correlator for producing a coherent-mode discrimination signal for a first of the PRN encoded signals by correlating the in-phase (I) samples of the first of the PRN encoded signals with a discrimination pattern, the first PRN encoded signal being encoded with a first PRN code and having a code clock period that determines when changes of polarity may occur in the PRN code; and a discrimination pattern generator for generating said discrimination pattern, including a local PRN code generator providing a locally generated version of the first PRN code, the discrimination pattern being comprised of two or more segments derived from the locally generated PRN code, the segments being narrow relative to the clock period of the PRN code, and having multiple polarities and selected widths and amplitudes determined as a function of the locally generated PRN code, wherein the phase of said discrimination pattern is adjusted based on said coherent-mode discrimination signal, to synchronize the discrimination pattern generator with the received first PRN encoded signal, and wherein the selection of widths, amplitudes and polarities of the segments of the discrimination pattern results in mitigation of multipath signal effects in code synchronization.

5. A code synchronization circuit as defined in claim 4, and further comprising an averaging circuit for generating a code phase control signal by averaging the coherent-mode discrimination signal.

6. The code synchronization circuit of claim 4, and further including:

an I-channel prompt correlator for correlating the in-phase (I) samples of the first PRN encoded signal with a replica of said PRN code so as to form a demodulated I-channel signal, and a Q-channel prompt correlator for correlating the quadrature samples of the first PRN encoded signal with a replica of said PRN code so as to form a demodulated Q-channel signal.

7. In a receiver for decoding a plurality of pseudorandom noise (PRN) encoded signals, the receiver providing digital in-phase (I) and quadrature (Q) samples of the PRN encoded signals, a method of code synchronization comprising the steps of:

producing a coherent-mode discrimination signal by correlating in-phase (I) samples of a first of said PRN encoded signals with a discrimination pattern, the first PRN encoded signal being encoded with a first PRN code;

generating the discrimination pattern, wherein the generating step includes locally generating a duplicate of the first PRN encoded signal, then logically combining clock signals and the locally generated PRN code to obtain multiple occurrences of a discrimination pattern, each occurrence having two or more pattern segments having multiple polarities, the segments being narrow relative to a PRN code clock period, and having selected widths and amplitudes; and adjusting the phase of the locally generated PRN code and, therefore, the phase of the discrimination pattern, based on the value of the coherent-mode discrimination signal, to synchronize the discrimination pattern with the received PRN encoded signal;

and wherein the selection of widths, amplitudes and polarities of the segments of the discrimination pattern results in mitigation of multipath signal effects in code synchronization.

8. In a GPS receiver in which a code synchronization circuit produces a code phase control signal useable to adjust the phase of a locally generated code signal relative to the phase of a received pseudorandom noise (PRN) encoded signal, a method of producing a discrimination pattern for use within said code synchronization circuit, said method comprising the steps of:

locally generating a PRN code signal which is the same as the received PRN encoded signal;

deriving from the locally generated PRN code a first pattern segment having a predetermined phase relative to the phase of the locally generated PRN code;

deriving from the locally generated PRN code at least one additional pattern segment shifted in phase relative to said first pattern segment; and combining the first and at least one additional pattern segments in order to form multiple occurrences of the discrimination pattern;

wherein the pattern segments are narrow relative to a PRN code clock period, and have selected widths and amplitudes;

and wherein the combined first and additional pattern segments together have both polarities in each occurrence of the discrimination pattern;

and wherein the selection of widths, amplitudes and polarities of the segments of the discrimination pattern results in mitigation of multipath signal effects in code synchronization.

9. In a receiver for decoding received pseudorandom noise (PRN) encoded signals, apparatus for mitigating effects of multipath signals on code tracking of the received PRN signals, the apparatus comprising:

a PRN code generator for generating a replica of the PRN code and for generating related code multipath mitigation windows (MMWs);

a controllable oscillator, for generating timing signals for the PRN code generator;

a first correlator, for correlating the received PRN signals with the replica of the PRN code, to derive phase error signals used for controlling the oscillator; and a second correlator, for correlating the received PRN signals with the code MMWs, and thereby generating code error signals, in accordance with a code error function, used to control the PRN code generator to synchronize the generated PRN code with the received PRN code signals;

wherein the code error function effectively has a zero value at a desired track point when the generated PRN code is synchronized with the received PRN signals and, immediately on each side of the tracking point, has a polarity that depends on whether the generated PRN code is early or late with respect to the received PRN code;

and wherein the shape of the code MMWs generated by the PRN code generator is selected to provide a code error function that mitigates the effect of received multipath signals by providing an error value that increases rapidly in opposite directions from the track point, but assumes a practically zero value when the code MMWs are advanced only a fraction of a PRN code chip from the track point, whereby a code error function associated with delayed multipath code signals will have a practically zero value near the desired track point and will have little or no effect on tracking the received code signals.

10. Apparatus as defined in claim 9, wherein:

the code MMWs are narrow with respect to a PRN code chip and are timed to occur at code clock positions.

11. Apparatus as defined in claim 9, wherein:

the code MMWs are narrow with respect to a PRN code chip and are timed to occur at code clock positions, wherein each instance of the code MMW is asymmetric about the desired track point.

12. Apparatus as defined in claim 11, wherein:

each instance of the code MMW includes a first segment approximately aligned with the code clock position and a second segment adjacent to the first segment and having opposite polarity and a different amplitude from that of the first segment.

13. Apparatus as defined in claim 12, wherein:

multiple instances of the code MMW collectively have a zero average value.

14. Apparatus as defined in claim 11, wherein:

each instance of the code MMW includes a first segment approximately aligned with the code clock position and a second segment adjacent to the first segment and having opposite polarity and a different width from that of the first segment.

15. Apparatus as defined in claim 14, wherein:

multiple instances of the code MMW collectively have a zero average value.

16. Apparatus as defined in claim 11, wherein:

multiple instances of the code MMW collectively have a zero average value.

17. For use in a receiver for decoding received pseudorandom noise (PRN) encoded signals, a method for mitigating effects of multipath signals on code tracking of the received PRN signals, the method comprising the steps of:

generating a replica of the PRN code;

generating related code multipath mitigation windows (MMWs);

generating timing signals, in a controllable oscillator, to control the steps of generating the replica of the PRN code and the code MMWs;

correlating the received PRN signals with the replica of the PRN code, to derive phase error signals used for controlling the oscillator;

correlating the received PRN signals with the code MMWs, and thereby generating code error signals, in accordance with a code error function; and controlling the step of generating the PRN code, to synchronize the generated PRN code with the received PRN code signals;

wherein the code error function effectively has a zero value at a desired track point when the generated PRN code is synchronized with the received PRN signals and, immediately on each side of the tracking point, has a polarity that depends on whether the generated PRN code is early or late with respect to the received PRN code;

and wherein the shape of the code MMWs generated by the PRN code generator is selected to provide a code error function that mitigates the effect of received multipath signals by providing an error value that increases rapidly in opposite directions from the track point, but assumes a practically zero value when the code MMWs are advanced only a fraction of a PRN code chip from the track point, whereby a code error function associated with delayed multipath code signals will have a practically zero value near the desired track point and will have little or no effect on tracking the received code signals.

18. A method as defined in claim 17, wherein:

the code MMWs are narrow with respect to a PRN code chip and are timed to occur at code clock positions.

19. A method as defined in claim 17, wherein:

the code MMWs are narrow with respect to a PRN code chip and are timed to occur at code clock positions, wherein each instance of the code MMW is asymmetric about the desired track point.

20. A method as defined in claim 19, wherein:

each instance of the code MMW includes a first segment approximately aligned with a code clock position and a second segment adjacent to the first segment and having opposite polarity and a different amplitude from that of the first segment.

21. A method as defined in claim 20, wherein:

multiple instances of the code MMW collectively have a zero average value.

22. A method as defined in claim 19, wherein:

each instance of the code MMW includes a first segment approximately aligned with the code clock position and a second segment adjacent to the first segment and having opposite polarity and a different width from that of the first segment.

23. A method as defined in claim 22, wherein:

multiple instances of the code MMW collectively have a zero average value.

24. A method as defined in claim 19, wherein:

multiple instances of the code MMW collectively have a zero average value.

* * * * *

UNITED STATES PATENT AND TRADEMARK OFFICE
CERTIFICATE OF CORRECTION

PATENT NO.    : 6,163,567
DATED         : December 19, 2000
INVENTOR(S)   : Ronald R. Hatch It is certified that error appears in the above-identified patent and that said Letters Patent is hereby corrected as shown below:

Column 1,
Line 44, change "tiring" to -- timing --.

Column 2,
Line 3, change "Le." to -- ie. --.

Column 6,
Line 61, change "one-eighth" 0" to -- one-eighth --.

Column 9,
Line 4, after "0" put a space.

Signed and Sealed this

Seventeenth Day of June, 2003

JAMES E. ROGAN
*Director of the United States Patent and Trademark Office*